Figure 1:
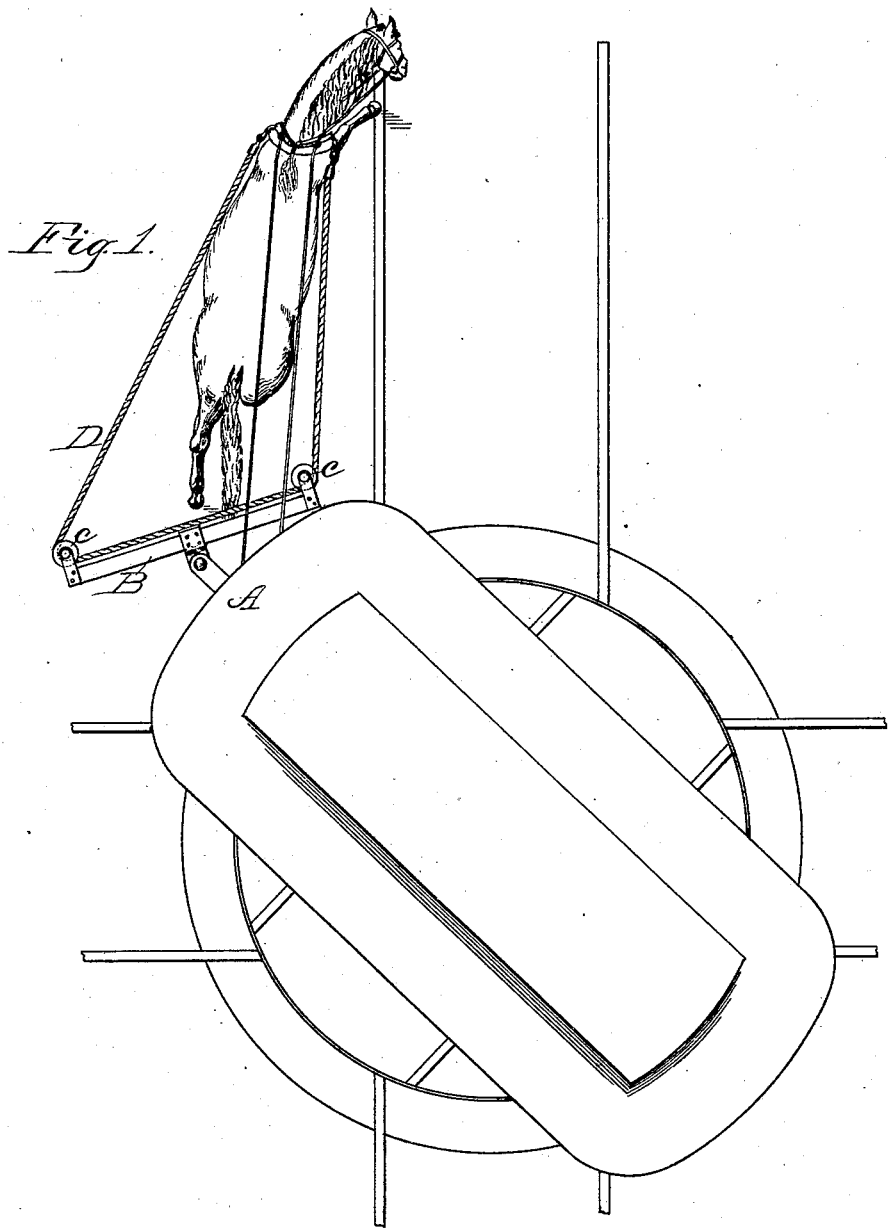

(No Model.)

J. P. MESSER.
DRAFT ATTACHMENT FOR STREET CARS.

No. 279,784. Patented June 19, 1883.

Witnesses
S. M. Endicott
Frank G. Clark

Inventor.
John P. Messer
By J. M. St. John,
His Atty.

UNITED STATES PATENT OFFICE.

JOHN P. MESSER, OF CEDAR RAPIDS, IOWA.

DRAFT ATTACHMENT FOR STREET-CARS.

SPECIFICATION forming part of Letters Patent No. 279,784, dated June 19, 1883.

Application filed April 2, 1883. (No model.)

*To all whom it may concern:*

Be it known that I, JOHN P. MESSER, a citizen of the United States, residing at Cedar Rapids, in the county of Linn and State of Iowa, have invented certain new and useful Improvements in Draft Attachments for Street-Cars, of which the following is a specification.

My invention relates to improved means of attaching horses to street-cars; and my object is to so construct the trace and single-tree that the draft on each trace shall be uniform whatever may be the angle of the single-tree to the line of draft, thereby increasing the drawing capacity and securing greater comfort to the horse in turning short curves or revolving the car on turn-tables. This I accomplish by means of a trace made continuous from one point of attachment to the harness to the other, and passing from end to end of the single-tree around sheaves or other suitable device permitting a free movement of the trace thereon or therein.

In the accompanying drawing, forming a part of this specification, the invention is represented attached to a street-car in process of change from one track to a diverging track on a turn-table.

The invention is so simple as to require little explanation.

To the end of the street-car A is attached rigidly, or so as to allow horizontal oscillation, a single-tree, B. To the ends of this single-tree are pivoted sheaves C C, having a groove adapted to carry the trace D and allow a free movement of the trace back and forth. The trace D is preferably round, and may be of rope or leather, as desired. It is made continuous from the point of attachment to the draft apparatus of the harness on one side to that on the other. The trace is preferably attached directly to the hames, and is provided with suitable hooks, snaps, or other device for this purpose. Instead of placing the apparatus around which the trace operates on top of the draft-bar and covering the rollers with boxes, as has been done hitherto for other purposes, I place the sheaves on the same horizontal line as the single-tree, thus securing a direct central draft on it, and leaving it no thicker than the ordinary single-tree. I prefer to place the sheaves in front of the single-tree, as shown, because the single-tree then serves as a guard to prevent the trace from slipping out of the sheave; but the sheave may be placed at the end or behind it, suitable provision being made to keep the trace in position in the sheaves. As will be seen, the sheaves run between straps fastened to the upper and lower sides of the single-tree.

The invention not only secures greater comfort to the animal and enables him to exert his whole strength in turning the car and going around curves, but obviates the common injury to the end of the car by the inner end of the single-tree in turning. This battering and marring action constitutes a serious objection to many of the single-trees in use on street-cars. It will be seen that the strain on the outer end of my single-tree is only relatively greater than that on the inner end, and the single-tree rests against the end of the car steadily in turning, and is not jerked against it by the lungeing of the horse, battering and injuring it, as above mentioned. If desired, the single-tree may be secured rigidly to the car, and all possibility of such injury is absolutely prevented. The invention also allows the horse to turn in a shorter circle than formerly in changing tracks from the turn-table and to keep between the tracks in going around the shortest curves.

Having thus described my invention, what I claim as new, and desire to secure by Letters Patent, is—

In a draft attachment for street-cars, the continuous trace, connected at each end to the draft apparatus of the harness, and the single-tree or draft-bar, as described, having sheaves horizontally central therewith, around which the trace passes and operates, substantially as and for the purpose set forth.

In testimony whereof I affix my signature in presence of two witnesses.

JOHN P. MESSER.

Witnesses:
J. M. ST. JOHN,
S. M. ENDICOTT.